(12) United States Patent
Yoon et al.

(10) Patent No.: US 12,508,535 B2
(45) Date of Patent: *Dec. 30, 2025

(54) PRESSURE SWING ADSORPTION APPARATUS FOR HYDROGEN PURIFICATION FROM DECOMPOSED AMMONIA GAS AND HYDROGEN PURIFICATION METHOD USING THE SAME

(71) Applicant: KOREA INSTITUTE OF ENERGY RESEARCH, Daejeon (KR)

(72) Inventors: Hyung-chul Yoon, Daejeon (KR); Sang-sup Han, Daejeon (KR); Hee-tae Beum, Daejeon (KR); Kanghee Cho, Daejeon (KR); Sun Hyung Kim, Daejeon (KR); Hyung Kuk Ju, Jeonju-si (KR)

(73) Assignee: Korea Institute of Energy Research, Daejeon (KR)

( * ) Notice: Subject to any disclaimer, the term of this patent is extended or adjusted under 35 U.S.C. 154(b) by 428 days.

This patent is subject to a terminal disclaimer.

(21) Appl. No.: 18/013,538

(22) PCT Filed: Apr. 11, 2022

(86) PCT No.: PCT/KR2022/005205
§ 371 (c)(1),
(2) Date: Dec. 28, 2022

(87) PCT Pub. No.: WO2023/128071
PCT Pub. Date: Jul. 6, 2023

(65) Prior Publication Data
US 2024/0100469 A1    Mar. 28, 2024

(30) Foreign Application Priority Data
Dec. 31, 2021 (KR) ........................ 10-2021-0193702

(51) Int. Cl.
*B01D 53/047* (2006.01)
*B01D 53/053* (2006.01)
(Continued)

(52) U.S. Cl.
CPC .......... *B01D 53/0476* (2013.01); *C01B 3/047* (2013.01); *C01B 3/56* (2013.01);
(Continued)

(58) Field of Classification Search
CPC .......... B01D 53/0476; B01D 2253/102; B01D 2253/104; B01D 2253/106;
(Continued)

(56) References Cited

U.S. PATENT DOCUMENTS 3,111,387 A * 11/1963 Avery .................. G01S 3/8038
95/103
3,257,812 A * 6/1966 Shaievitz ............... F25J 3/0655
62/934
(Continued)

FOREIGN PATENT DOCUMENTS

CN    106517092 A    3/2017
JP    H06037624 B2   5/1994
(Continued)

OTHER PUBLICATIONS

Machine-generated English translation of WO 2018116982A1, published Jun. 28, 2018 (Year: 2018).*
(Continued)

*Primary Examiner* — Frank M Lawrence, Jr.
(74) *Attorney, Agent, or Firm* — Rabin & Berdo, P.C.

(57) ABSTRACT

The present disclosure relates to a pressure swing adsorption apparatus for hydrogen purification from decomposed ammonia gas and a hydrogen purification method using the same, and more particularly, the pressure swing adsorption
(Continued)

apparatus of the present disclosure includes a plurality of adsorption towers including a pretreatment unit and a hydrogen purification unit wherein the adsorption towers of the pretreatment unit and the hydrogen purification unit are packed with different adsorbents, thereby achieving high purity hydrogen purification from mixed hydrogen gas produced after ammonia decomposition, making it easy to replace the adsorbent for ammonia removal, minimizing the likelihood that the lifetime of the adsorbent in the hydrogen purification unit is drastically reduced by a very small amount of ammonia, and actively responding to a large change in ammonia concentration in the raw material.

Additionally, a hydrogen purification method using the pressure swing adsorption apparatus of the present disclosure physically adsorbs and removes impurities such as moisture ($H_2O$), ammonia ($NH_3$) and nitrogen ($N_2$) included in mixed hydrogen gas produced after ammonia decomposition below extremely small amounts, thereby achieving high purity hydrogen purification with improved selective adsorption of moisture, ammonia and nitrogen and maximized hydrogen recovery rate and productivity. In addition, since the temperature swing adsorption process is not introduced, there is no need for a heat source for regeneration, thereby reducing the driving cost.

15 Claims, 3 Drawing Sheets

(51) Int. Cl.
*B01J 20/18* (2006.01)
*C01B 3/04* (2006.01)
*C01B 3/56* (2006.01)

(52) U.S. Cl.
CPC .. *B01D 2253/102* (2013.01); *B01D 2253/104* (2013.01); *B01D 2253/106* (2013.01); *B01D 2253/108* (2013.01); *B01D 2253/1122* (2013.01); *B01D 2253/25* (2013.01); *B01D 2256/16* (2013.01); *B01D 2257/406* (2013.01); *B01D 2257/80* (2013.01); *B01D 2259/40013* (2013.01); *B01D 2259/40028* (2013.01); *B01D 2259/40035* (2013.01); *B01D 2259/40043* (2013.01); *B01D 2259/40071* (2013.01); *B01D 2259/4062* (2013.01); *B01D 2259/4146* (2013.01); *C01B 2203/0266* (2013.01); *C01B 2203/043* (2013.01); *C01B 2203/0495* (2013.01)

(58) Field of Classification Search
CPC ...... B01D 2253/108; B01D 2253/1122; B01D 2253/25; B01D 2256/16; B01D 2257/406; B01D 2257/80; B01D 2259/40013; B01D 2259/40028; B01D 2259/40035; B01D 2259/40043; B01D 2259/40071; B01D 2259/4062; B01D 2259/4146; B01D 2257/102; B01D 2259/40016; B01D 2259/40037; B01D 2259/402; B01D 2259/404; B01D 53/053; B01D 53/047; C01B 3/047; C01B 3/56; C01B 2203/0266; C01B 2203/043; C01B 2203/0495; C01B 2203/0465; C01B 2203/042; C01B 2210/0015; C01B 2210/0018; C01B 2210/0046; C01B 2210/0062; C01B 2210/0065; Y02E 60/36; B01J 20/18; B01J 20/20
USPC ............ 95/96, 98, 102, 103, 117, 128, 130; 96/121, 122, 127, 132–136, 153; 423/237, 239.1
See application file for complete search history.

(56) References Cited

U.S. PATENT DOCUMENTS

| | | | | |
|---|---|---|---|---|
| 4,077,780 | A * | 3/1978 | Doshi | B01D 53/047 95/143 |
| 4,266,957 | A * | 5/1981 | Isalski | B01D 53/04 62/934 |
| 4,752,311 | A * | 6/1988 | MacLean | F25J 3/0285 95/143 |
| 5,547,492 | A | 8/1996 | Cho et al. | |
| 2006/0254425 | A1* | 11/2006 | Baksh | B01J 20/28052 96/132 |
| 2018/0323457 | A1* | 11/2018 | Kojima | B01J 20/18 |
| 2024/0139669 | A1* | 5/2024 | Ahn | C01B 3/04 |
| 2025/0001352 | A1* | 1/2025 | Han | B01D 53/0446 |

FOREIGN PATENT DOCUMENTS

| | | | | |
|---|---|---|---|---|
| JP | 2015059075 | A | 3/2015 | |
| KR | 1019970008347 | B1 | 5/1997 | |
| KR | 20090005508 | A | 1/2009 | |
| KR | 1020170042655 | A | 4/2017 | |
| KR | 20180083877 | A | 7/2018 | |
| KR | 20190059278 | A | 5/2019 | |
| KR | 1020190054742 | A | 5/2019 | |
| KR | 1020190059278 | A | 5/2019 | |
| KR | 20190062953 | A * | 6/2019 | |
| KR | 102315763 | B1 | 10/2021 | |
| WO | WO-2018116982 | A1 * | 6/2018 | ............. B01D 53/04 |

OTHER PUBLICATIONS

Machine-generated English translation of KR102315763B1, published Oct. 21, 2021 (Year: 2021).*
Machine-generated English translation of Kr 20190062953A, published Jun. 7, 2019 (Year: 2019).*

* cited by examiner

PRESSURE SWING ADSORPTION APPARATUS FOR HYDROGEN PURIFICATION FROM DECOMPOSED AMMONIA GAS AND HYDROGEN PURIFICATION METHOD USING THE SAME

TECHNICAL FIELD

The present disclosure relates to a pressure swing adsorption apparatus for purifying hydrogen by removing moisture, ammonia and nitrogen from mixed hydrogen gas produced from decomposed ammonia gas and a hydrogen purification method using the same.

BACKGROUND ART

Ammonia based hydrogen storage, transport, extraction and utilization technology development is gaining much attention to achieve the goal of carbon neutrality. For hydrogen supply using clean ammonia as a raw material, ammonia decomposition technology is required, and decomposed ammonia gas contains hydrogen as well as nitrogen ($N_2$), ammonia ($NH_3$) and moisture ($H_2O$). Accordingly, to produce high purity hydrogen, it is necessary to remove nitrogen, moisture and ammonia.

Adsorption by chemical bonds with acid groups of adsorbents has been primarily used to remove ammonia, and the adsorbents are regenerated using the temperature swing adsorption purification method. The pressure swing adsorption purification method can be only used in physical adsorption by intermolecular forces such as van der Waals force between impurities and adsorbents.

Currently, methods for producing high purity hydrogen using ammonia are not yet commercialized, and to separate only hydrogen from decomposed ammonia gas with high purity, a hybrid of a Temperature Swing Adsorption (TSA) process for removing undecomposed ammonia and a Pressure Swing Adsorption (PSA) process for removing nitrogen is being developed.

However, since the existing commercial ammonia adsorbents chemically adsorb ammonia through acid-base reaction, they can only adsorb and desorb ammonia by the temperature swing adsorption process, and for use in the pressure swing adsorption process, adsorbents capable of physical adsorption are necessary. Additionally, the existing pressure swing adsorption hydrogen purification process for high purity hydrogen production involves selectively removing CO, $CH_4$, $CO_2$ and light hydrocarbon from mixed gas including $H_2$, $CO_2$, $CH_4$, CO and light hydrocarbon ($C_1$-$C_4$ hydrocarbon), and is only aimed at minimizing the device size and increasing the hydrogen recovery rate.

RELATED LITERATURES

Patent Literature (Patent Literature 1) Korean Patent No. 10-2315763

DISCLOSURE

Technical Problem

To solve the above-described problem, the present disclosure is directed to providing a pressure swing adsorption apparatus for hydrogen purification from decomposed ammonia gas, including a plurality of adsorption towers including a pretreatment unit and a hydrogen purification unit, wherein the adsorption towers of the pretreatment unit and the hydrogen purification unit are packed with different adsorbents.

The present disclosure is further directed to providing a pressure swing adsorption apparatus for hydrogen purification from decomposed ammonia gas, including a plurality of adsorption towers including a pretreatment unit and a hydrogen purification unit, wherein at least two adsorption towers of the pretreatment unit are arranged in parallel, at least four adsorption towers of the hydrogen purification unit are arranged in parallel, and the adsorption towers of the pretreatment unit and the hydrogen purification unit are packed with different adsorbents.

The present disclosure is further directed to providing a hydrogen purification method using a pressure swing adsorption apparatus for hydrogen purification with improved selective adsorption of moisture, ammonia and nitrogen in mixed hydrogen gas, and maximized hydrogen recovery rate and productivity.

Technical Solution

The present disclosure provides a pressure swing adsorption apparatus for hydrogen purification from decomposed ammonia gas, including a plurality of adsorption towers including a pretreatment unit and a hydrogen purification unit, connected to a raw material feed pipe; a vacuum pump connected to the adsorption towers to keep the adsorption towers in a vacuum state; a hydrogen storage tank to capture purified hydrogen from the adsorption towers; and a plurality of valves to open/close a plurality of pipes connected to the adsorption towers, the vacuum pump and the hydrogen storage tank, wherein the adsorption tower in the pretreatment unit is packed with a first adsorbent and a second adsorbent in a multilayer structure to selectively adsorb and remove moisture and ammonia included in mixed hydrogen gas produced after ammonia decomposition fed through the raw material feed pipe, and wherein the adsorption tower in the hydrogen purification unit is packed with a third adsorbent to purify hydrogen by selectively adsorbing nitrogen included in the mixed hydrogen gas free of moisture and ammonia from the pretreatment unit.

Additionally, the present disclosure provides a pressure swing adsorption apparatus for hydrogen purification from decomposed ammonia gas, including a plurality of adsorption towers including a pretreatment unit and a hydrogen purification unit, connected to a raw material feed pipe; a vacuum pump connected to the adsorption towers to keep the adsorption towers in a vacuum state; a hydrogen storage tank to capture purified hydrogen from the adsorption towers; and a plurality of valves to open/close a plurality of pipes connected to the adsorption towers, the vacuum pump and the hydrogen storage tank, wherein at least two adsorption towers of the pretreatment unit are arranged in parallel, and each of the at least two adsorption towers is packed with a first adsorbent and a second adsorbent in a multilayer structure to selectively adsorb and remove moisture and ammonia included in mixed hydrogen gas produced after ammonia decomposition fed through the raw material feed pipe, and wherein at least four adsorption towers of the hydrogen purification unit are arranged in parallel, and each of the at least four adsorption towers is packed with a third adsorbent to purify hydrogen by selectively adsorbing nitrogen included in the mixed hydrogen gas free of moisture and ammonia from the pretreatment unit.

Additionally, the present disclosure provides a hydrogen purification method using the pressure swing adsorption apparatus according to the present disclosure including the plurality of adsorption towers including the pretreatment unit and the hydrogen purification unit, connected to the raw material feed pipe; the vacuum pump connected to the adsorption towers to keep the adsorption towers in a vacuum state; the hydrogen storage tank to capture purified hydrogen from the adsorption towers; and the plurality of valves to open/close the plurality of pipes connected to the adsorption towers, the vacuum pump and the hydrogen storage tank, the hydrogen purification method including the steps of feeding mixed hydrogen gas produced after ammonia decomposition into the adsorption tower of the pretreatment unit through the raw material feed pipe; selectively adsorbing and removing moisture by allowing the fed mixed hydrogen gas to pass through a first adsorbent packed at a lower layer region of the adsorption tower in the pretreatment unit; selectively adsorbing and removing ammonia by allowing the mixed hydrogen gas free of moisture to pass through a second adsorbent packed at an upper layer region of the adsorption tower in the pretreatment unit; feeding the mixed hydrogen gas free of ammonia into the adsorption tower of the hydrogen purification unit; selectively adsorbing and removing nitrogen by allowing the fed mixed hydrogen gas free of ammonia to pass through a third adsorbent packed in the adsorption tower in the hydrogen purification unit to acquire purified hydrogen; and capturing the acquired hydrogen in the hydrogen storage tank.

Advantageous Effects

Since the pressure swing adsorption apparatus according to the present disclosure includes the plurality of adsorption towers including the pretreatment unit and the hydrogen purification unit wherein each adsorption tower is packed with different adsorbents, it is possible to achieve high purity hydrogen purification from mixed hydrogen gas produced after ammonia decomposition, make it easy to replace the adsorbent for ammonia removal, minimize the likelihood that the lifetime of the adsorbent in the hydrogen purification unit is drastically reduced by a very small amount of ammonia, and respond to a large change in ammonia concentration in the raw material.

Additionally, since the hydrogen purification method using the pressure swing adsorption apparatus of the present disclosure physically adsorbs and removes impurities such as moisture ($H_2O$), ammonia ($NH_3$) and nitrogen ($N_2$) included in mixed hydrogen gas produced after ammonia decomposition below extremely small amounts, it is possible to achieve high purity hydrogen purification with improved selective adsorption of moisture, ammonia and nitrogen and maximized hydrogen recovery rate and productivity. When only the pressure swing adsorption process is applied, since the temperature swing adsorption process is not introduced, there is no need for a heat source for regeneration, thereby reducing the driving cost.

The effect of the present disclosure is not limited to the above-mentioned effect. It should be understood that the effect of the present disclosure includes all inferable effects from the following description.

BEST MODE

Hereinafter, an embodiment of the present disclosure will be described in more detail.

The present disclosure relates to a pressure swing adsorption (PSA) apparatus for purifying hydrogen by removing moisture, ammonia and nitrogen from mixed hydrogen gas produced from decomposed ammonia gas and a hydrogen purification method using the same.

As described above, since the existing commercial ammonia adsorbents chemically adsorb ammonia through acid-base reaction, they can only adsorb and desorb ammonia in the temperature swing adsorption process, and for use in the pressure swing adsorption process, adsorbents capable of physical adsorption are necessary. Additionally, the existing pressure swing adsorption hydrogen purification process involves selectively removing CO, $CH_4$, $CO_2$ and light hydrocarbon from mixed gas including $H_2$, $CO_2$, $CH_4$, CO and light hydrocarbon ($C_1$-$C_4$ hydrocarbon), and is only aimed at minimizing the device size and increasing the hydrogen recovery rate.

Accordingly, the present disclosure provides the pressure swing adsorption apparatus including a plurality of adsorption towers including a pretreatment unit and a hydrogen purification unit wherein each adsorption tower is packed with different adsorbents, thereby achieving high purity hydrogen purification from mixed hydrogen gas produced after ammonia decomposition, making it easy to replace the adsorbent for ammonia removal, minimizing the likelihood that the lifetime of the adsorbent in the hydrogen purification unit is drastically reduced by ammonia, and actively responding to a large change in ammonia concentration in the raw material.

Additionally, the hydrogen purification method using the pressure swing adsorption apparatus of the present disclosure physically adsorbs and removes impurities such as moisture ($H_2O$), ammonia ($NH_3$) and nitrogen ($N_2$) included in mixed hydrogen gas produced after ammonia decomposition below extremely small amounts, thereby purifying hydrogen with improved selective adsorption of moisture, ammonia and nitrogen, and maximized hydrogen recovery rate and productivity. Additionally, since the temperature swing adsorption process is not introduced, there is no need for a heat source for regeneration, thereby reducing the driving cost.

(a) Configuration of Pressure Swing Adsorption Apparatus

Specifically, the present disclosure provides a pressure swing adsorption apparatus for hydrogen purification from decomposed ammonia gas, including a plurality of adsorption towers including a pretreatment unit and a hydrogen purification unit, connected to a raw material feed pipe; a vacuum pump connected to the adsorption towers to keep the adsorption towers in a vacuum state; a hydrogen storage tank to capture purified hydrogen from the adsorption towers; and a plurality of valves to open/close a plurality of pipes connected to the adsorption towers, the vacuum pump and the hydrogen storage tank, wherein the adsorption tower in the pretreatment unit is packed with a first adsorbent and a second adsorbent in a multilayer structure to selectively adsorb and remove moisture and ammonia included in mixed hydrogen gas produced after ammonia decomposition fed through the raw material feed pipe, and the adsorption tower in the hydrogen purification unit is packed with a third adsorbent used to purify hydrogen by selectively adsorbing nitrogen included in the mixed hydrogen gas free of moisture and ammonia from the pretreatment unit.

Additionally, the present disclosure provides a pressure swing adsorption apparatus for hydrogen purification from decomposed ammonia gas, including a plurality of adsorption towers including a pretreatment unit and a hydrogen purification unit, connected to a raw material feed pipe; a vacuum pump connected to the adsorption towers to keep the adsorption towers in a vacuum state; a hydrogen storage tank to capture purified hydrogen from the adsorption towers; and a plurality of valves to open/close a plurality of pipes connected to the adsorption towers, the vacuum pump and the hydrogen storage tank, wherein at least two adsorption towers of the pretreatment unit are arranged in parallel, each of the at least two adsorption towers is packed with a first adsorbent and a second adsorbent in a multilayer structure to selectively adsorb and remove moisture and ammonia included in mixed hydrogen gas produced after ammonia decomposition fed through the raw material feed pipe, at least four adsorption towers of the hydrogen purification unit are arranged in parallel, and each of the at least four adsorption towers is packed with a third adsorbent to purify hydrogen by selectively adsorbing nitrogen included in the mixed hydrogen gas free of moisture and ammonia from the pretreatment unit.

The pressure swing adsorption apparatus may produce high purity hydrogen by improving the physical adsorption selectivity of impurities generated during the ammonia decomposition process or intrinsic impurities included in the raw material such as moisture ($H_2O$), undecomposed ammonia ($NH_3$) and nitrogen ($N_2$) to reduce them below extremely small amounts, rather than removing impurities such as carbon monoxide (CO), methane ($CH_4$), carbon dioxide ($CO_2$) and light hydrocarbon ($C_1$-$C_4$ hydrocarbon) in the common hydrogen purification process. Preferably, the pressure swing adsorption apparatus may be a Vacuum Pressure Swing Adsorption (VPSA) apparatus.

The existing four-bed pressure swing adsorption apparatus purifies hydrogen by adsorbing moisture, ammonia and nitrogen from mixed hydrogen gas at the same time using at least two types of adsorbents stacked in one adsorption tower, but when undecomposed ammonia contacts the adsorbent for nitrogen adsorption, the performance and lifetime of the adsorbent may be reduced. Additionally, when there is a large change in ammonia concentration in the raw material, it is not easy to respond to the change, and when replacing the adsorbent, it is necessary to replace all the stacked adsorbents, resulting in increases in investment cost and driving cost.

Since the present disclosure includes the plurality of adsorption towers including the pretreatment unit for moisture and ammonia adsorption and purification and the hydrogen purification unit for nitrogen adsorption and purification in that order, it is possible to solve the problem with the performance and lifetime reduction of the adsorbent for nitrogen adsorption, and achieve the investment and driving cost savings.

In the pretreatment unit, two or more adsorption towers, preferably two or three adsorption towers may be arranged in parallel, and each adsorption tower may adsorb and remove moisture and ammonia in a sequential order by the adsorption, counter-current depressurization, cleaning, raw material pressurization and product pressurization processes while the mixed hydrogen gas fed through the raw material feed pipe passes through the adsorption towers.

The pretreatment unit is packed with the first adsorbent at the lower layer region in the adsorption tower and the second adsorbent at the upper layer region to selectively adsorb moisture and ammonia while the mixed hydrogen gas passes through the lower layer region and the upper layer region in the adsorption tower in a sequential order when the mixed hydrogen gas is fed from the raw material feed pipe.

The first adsorbent may be packed at the lower layer region in the adsorption tower of the pretreatment unit, and may be at least one of first activated alumina or silica gel capable of removing moisture, and preferably first activated alumina or silica gel.

The amount of the first adsorbent packed in the adsorption tower of the pretreatment unit may be 5 to 40 wt %, preferably 10 to 35 wt %, and most preferably 15 to 32 wt %. When the amount of the first adsorbent is less than 5 wt %, moisture removal may be inadequate, and on the contrary, when the amount of the first adsorbent is more than 40 wt %, the adsorbent packing density is inappropriate, considering the proportions of moisture and ammonia in the decomposed ammonia gas, resulting in insufficient ammonia removal efficiency of the second adsorbent.

The second adsorbent may be packed at the upper layer region in the adsorption tower of the pretreatment unit, and may be at least one selected from the group consisting of metal impregnated activated carbon, silica gel and second activated alumina, capable of removing ammonia, and preferably metal impregnated activated carbon.

The metal impregnated activated carbon has high ammonia selectivity and high ammonia adsorption capacity. The metal impregnated activated carbon may be activated carbon impregnated with at least one metal selected from the group consisting of Mg, Ca, Mn and Cu, preferably magnesium (Mg) impregnated activated carbon or calcium (Ca) impregnated activated carbon, and most preferably, magnesium (Mg) impregnated activated carbon. The magnesium impregnated activated carbon has higher ammonia adsorption performance than the other metal impregnated activated carbon and high ammonia adsorption capacity in small amounts.

The amount of metal impregnated in the metal impregnated activated carbon may be 1 to 10 wt %, preferably 1 to 8 wt %, and most preferably 1 to 6 wt %. In this instance, when the amount of metal impregnated is less than 1 wt %, the ammonia adsorption performance may not reach the expected level of performance, and on the contrary, when the amount of metal impregnated is more than 10 wt %, the increased adsorbent regeneration time is not favorable for the pressure swing adsorption process, which makes it difficult to adsorb and remove ammonia below a very small amount of 0.1 ppm or less.

The amount of the second adsorbent packed in the adsorption tower of the pretreatment unit may be 60 to 95 wt %, preferably 65 to 90 wt %, and most preferably 68 to 85 wt %. When the amount of the second adsorbent is less than 60 wt %, ammonia adsorption may be inadequate, so when ammonia enters the hydrogen purification unit, it may deteriorate the function of the adsorbent in the hydrogen purification unit, and on the contrary, when the amount of the second adsorbent is more than 95 wt %, ammonia adsorption removal may be adequate, but the moisture removal efficiency of the first adsorbent may be insufficient, resulting in reduced hydrogen recovery rate.

In the hydrogen purification unit, four or more adsorption towers, and preferably four to five adsorption towers may be arranged in parallel, through which the mixed hydrogen gas free of moisture and ammonia through the pretreatment unit passes to adsorb and remove nitrogen by the adsorption, primary pressure equalization, cleaning feed, secondary pressure equalization, counter-current depressurization, cleaning and pressurization processes to acquire high purity hydrogen.

The adsorption tower of the hydrogen purification unit is packed with the third adsorbent to selectively adsorb nitrogen included in the mixed hydrogen gas free of moisture and ammonia to purify high purity hydrogen. The purified hydrogen may be transferred through the valves and stored in the hydrogen storage tank.

The third adsorbent may be at least one selected from the group consisting of zeolite LiX, zeolite CaX, zeolite NaX, zeolite NaA and zeolite CaA, preferably at least one of zeolite LiX or zeolite CaX, and most preferably zeolite LiX.

In particular, although it is not explicitly described in the following example or comparative example, in the pressure swing adsorption apparatus according to the present disclosure, the hydrogen purification process is continuously performed 50 times using the mixed hydrogen gas produced after ammonia decomposition with varying seven conditions below.

As a result, as opposed to other conditions and numerical ranges, when the following conditions are all satisfied, the purity of the purified hydrogen is 99% or more, and the hydrogen recovery rate shows 85% or more improvement.

① The first adsorbent is packed at the lower layer region in the adsorption tower of the pretreatment unit, and is first activated alumina or silica gel capable of removing moisture, ② the first adsorbent is packed in an amount of 10 to 35 wt % relative to the second adsorbent in the adsorption tower of the pretreatment unit, ③ the second adsorbent is packed at the upper layer region in the adsorption tower of the pretreatment unit, and is metal impregnated activated carbon capable of removing ammonia, ④ the second adsorbent is packed in an amount of 65 to 90 wt % relative to the first adsorbent in the adsorption tower of the pretreatment unit, ⑤ the metal impregnated activated carbon is magnesium (Mg) impregnated activated carbon or calcium (Ca) impregnated activated carbon, ⑥ the amount of metal impregnated in the metal impregnated activated carbon is 1 to 8 wt %, and ⑦ the third adsorbent is at least one of zeolite LiX or zeolite CaX.

However, when any one of the above seven conditions is not satisfied, the purified hydrogen recovery rate is 80% or less, and unadsorbed moisture, ammonia or nitrogen is detected more than the reference range and thus the purity of the purified hydrogen shows a low level of 97% or less.

In particular, although it is not explicitly described in the following example or comparative example, in the pressure swing adsorption apparatus according to the present disclosure, the appropriate hydrogen purification process steps are designed and performed 100 cycles using the mixed hydrogen gas produced after ammonia decomposition with varying six conditions below.

As a result, as opposed to other conditions and numerical ranges, it is found that when the following conditions are all satisfied, the purified hydrogen recovery rate is significantly improved by about 90% or more, and even after the hydrogen purification process is continuously performed 100 cycles, the first to third adsorbents ensure long lifetime.

① The first adsorbent is packed at the lower layer region in the adsorption tower of the pretreatment unit, and is silica gel capable of removing moisture, ② the first adsorbent is packed in an amount of 15 to 32 wt % relative to the second adsorbent in the adsorption tower of the pretreatment unit, ③ the second adsorbent is packed at the upper layer region in the adsorption tower of the pretreatment unit, and is magnesium (Mg) impregnated activated carbon capable of removing ammonia, ④ the second adsorbent is packed in an amount of 68 to 85 wt % relative to the first adsorbent in the adsorption tower of the pretreatment unit, ⑤ the amount of magnesium (Mg) impregnated in the magnesium (Mg) impregnated activated carbon is 1 to 6 wt %, and ⑥ the third adsorbent is zeolite LiX.

However, when any one of the above six conditions is not satisfied, the purified hydrogen recovery rate shows a low level of less than 85%, and as the number of cycles of the hydrogen purification process increases, it results in some loss of the first and second adsorbents or the third adsorbent and consequential adsorption performance degradation, thereby failing to purify high purity hydrogen.

Figure 1:
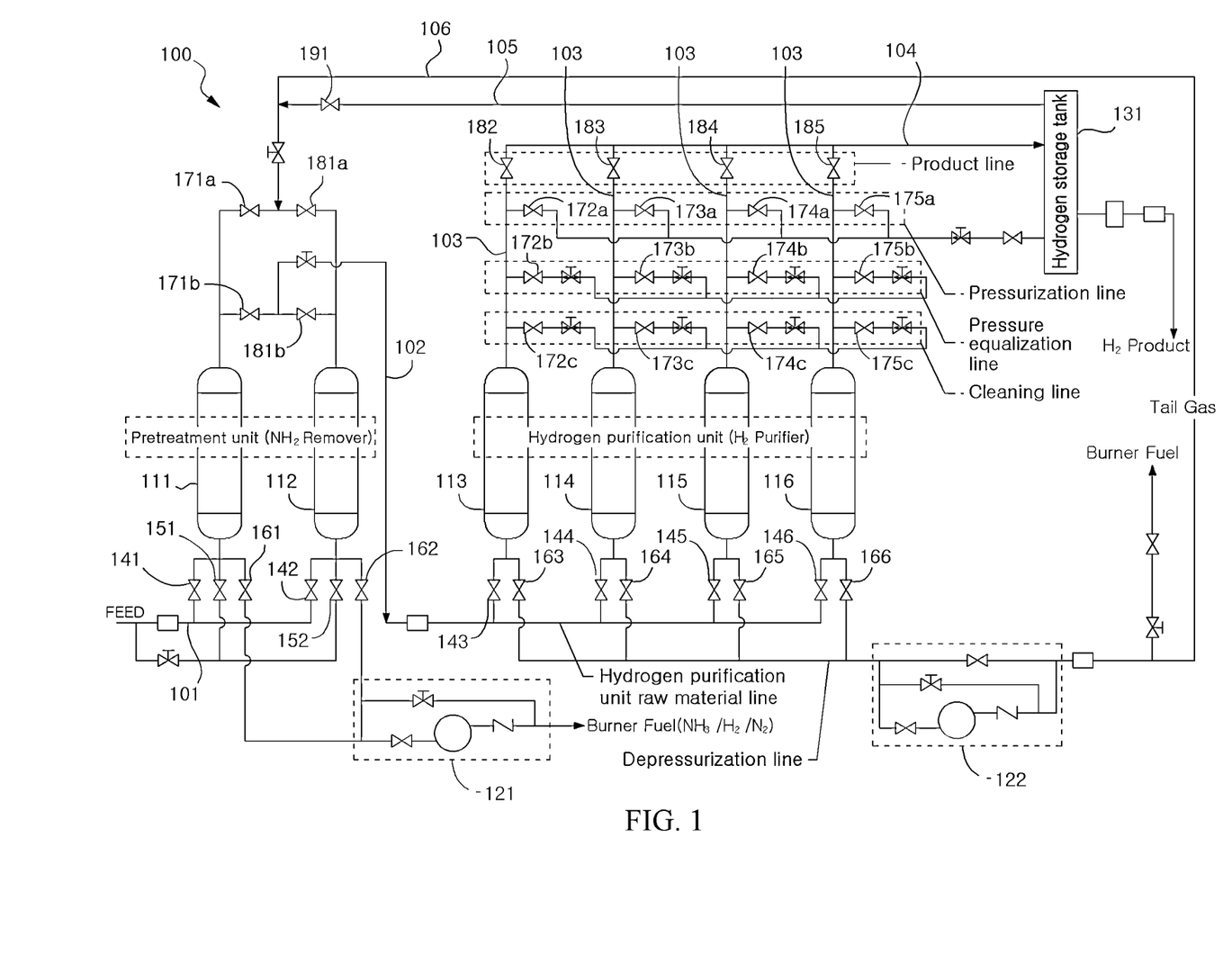
FIG. 1 is a diagram of a pressure swing adsorption apparatus according to the present disclosure.

FIG. 1 is a diagram of the pressure swing adsorption apparatus according to the present disclosure. Referring to FIG. 1, it is shown that the pressure swing adsorption apparatus 100 includes the plurality of adsorption towers 111-116 including the pretreatment unit and the hydrogen purification unit connected to the raw material feed pipe 101, the first and second vacuum pumps 121, 122 connected to the plurality of adsorption towers 111-116 to keep each of the plurality of adsorption towers 111-116 in a vacuum state, the hydrogen storage tank 131 in which hydrogen recovered from the adsorption towers 113-116 is stored, and the plurality of valves to open/close the plurality of pipes 102-106 connecting the adsorption towers, the hydrogen storage tank 131 and the vacuum pumps.

Additionally, it is shown that two adsorption towers 111, 112 of the pretreatment unit are arranged in parallel, and four adsorption towers 113-116 of the hydrogen purification unit are arranged in parallel. The bottom of the adsorption towers in the pretreatment unit is connected to the raw material feed pipe 101 for feeding the mixed hydrogen gas through the first feed valve 141. Each adsorption tower of the pretreatment unit and the hydrogen purification unit may purify high purity hydrogen from the mixed gas produced after ammonia decomposition by performing the process of each step of selective adsorption, primary pressure equalization, cleaning feed, secondary pressure equalization, depressurization, cleaning, primary and secondary pressure equalization and pressurization on moisture, ammonia and nitrogen included in the mixed hydrogen gas fed through the raw material feed pipe 101.

Below the adsorption towers, the first and second pressurization valves 151, 152 for raw material pressurization are installed at the rear side of the first and second feed valves 141, 142 installed on the raw material feed pipe 101, and the first and second discharge valves 161, 162 are individually installed for tail gas discharge of the pretreatment unit. The vacuum pump 121 of the pretreatment unit may be selectively applied depending on the regeneration rate of the first and second adsorbents, and is connected to the tail gas discharge valves.

The hydrogen purification unit feeds some of tail gas from the plurality of desorption valves 163-166 as cleaning gas of the adsorption towers 111, 112 in the pretreatment unit under the atmospheric pressure through the tail gas lines to regenerate the adsorption towers 111, 112 in the pretreatment unit, and feeds the product of the hydrogen purification unit in reverse through the product pressurization lines for final pressurization of the adsorption towers of the pretreatment unit.

The plurality of adsorption towers 111-116 including the pretreatment unit and the hydrogen purification unit is configured to individually transfer gas through the line valves connecting each adsorption tower, and the line valves are connected to the product line valves 182-185 directly connected to each adsorption tower and the hydrogen storage tank 131.

(b) Hydrogen Purification Method Using Pressure Swing Adsorption Apparatus

Meanwhile, the present disclosure provides a hydrogen purification method using the pressure swing adsorption apparatus according to the present disclosure including the plurality of adsorption towers including the pretreatment unit and the hydrogen purification unit, connected to the raw material feed pipe; the vacuum pump connected to the adsorption towers to keep the adsorption towers in a vacuum state; the hydrogen storage tank to capture purified hydrogen from the adsorption towers; and the plurality of valves to open/close the plurality of pipes connected to the adsorption towers, the vacuum pump and the hydrogen storage tank, the hydrogen purification method including the steps of feeding mixed hydrogen gas produced after ammonia decomposition into the adsorption tower of the pretreatment unit through the raw material feed pipe; selectively adsorbing and removing moisture by allowing the fed mixed hydrogen gas to pass through the first adsorbent packed at the lower layer region of the adsorption tower in the pretreatment unit; selectively adsorbing and removing ammonia by allowing the mixed hydrogen gas free of moisture to pass through the second adsorbent packed at the upper layer region of the adsorption tower in the pretreatment unit; feeding the mixed hydrogen gas free of ammonia into the adsorption tower of the hydrogen purification unit; selectively adsorbing and removing nitrogen by allowing the fed mixed hydrogen gas free of ammonia to pass through the third adsorbent packed in the adsorption tower in the hydrogen purification unit to acquire purified hydrogen; and capturing the acquired hydrogen in the hydrogen storage tank.

The step of feeding the mixed hydrogen gas may include feeding the mixed hydrogen gas after the removal of moisture and ammonia at one adsorption tower in the pretreatment unit. In this instance, the other adsorption tower in the pretreatment unit may undergo the pretreatment process of physically adsorbing and removing moisture and ammonia from the mixed hydrogen gas produced after ammonia decomposition through the process including the steps of cleaning with the atmospheric pressure cleaning gas (tail gas) fed from the hydrogen purification unit after counter-current depressurization below the adsorption driving pressure; raw material pressurization; and product pressurization.

The fed mixed hydrogen gas may be allowed to pass through the lower layer region of the adsorption tower in the pretreatment unit to selectively adsorb and remove moisture, and subsequently, may be allowed to pass through the upper layer region in a sequential order to selectively adsorb and remove ammonia. In particular, the step of selectively adsorbing and removing ammonia may include adsorbing and removing ammonia such that the amount of ammonia in the mixed hydrogen gas free of moisture is less than 0.1 ppm.

The adsorption tower of the pretreatment unit may undergo the adsorption step, the primary pressure equalization step, the cleaning feed step, the secondary pressure equalization step, the counter-current depressurization step, the cleaning step, the primary and secondary pressure equalization steps and the pressurization step in a sequential order to properly remove nitrogen from the mixed hydrogen gas free of moisture and ammonia fed into the hydrogen purification unit and increase the hydrogen product purity and recovery rate.

The step of feeding into the adsorption tower of the hydrogen purification unit may include feeding the mixed hydrogen gas free of moisture and ammonia from the pretreatment unit into one adsorption tower in the hydrogen purification unit.

The hydrogen purification unit may further undergo the adsorption step of feeding the mixed hydrogen gas free of ammonia into one adsorption tower to acquire the hydrogen product; the primary pressure equalization step of feeding the tail gas from the adsorption tower having undergone the adsorption step into the other adsorption tower to equalize the pressure; the cleaning feed step of cleaning the adsorbent in the other adsorption tower under the atmospheric pressure using effluent gas from any one of the adsorption towers having undergone the primary pressure equalization; the primary pressure equalization step of opening the valve to connect the cleaned adsorption tower to the adsorption tower that discharges gas for cleaning to equalize the pressure between the adsorption towers; the secondary pressure equalization step of opening the valve to connect the adsorption tower having undergone the primary pressure equalization to the other adsorption tower having undergone the adsorption step to equalize the pressure between the adsorption towers; and the product pressurization step of being fed with the hydrogen product in the counter-current direction to reach the adsorption pressure.

The hydrogen purification method may further include the step of feeding the remaining tail gas from the adsorption tower of the hydrogen purification unit into the adsorption tower of the pretreatment unit having undergone the counter-current depressurization step as purge gas to regenerate the adsorbent of the pretreatment unit.

The step of selectively adsorbing and removing nitrogen to acquire the purified hydrogen may include adsorbing and removing nitrogen such that the amount of nitrogen in the mixed hydrogen gas free of ammonia is less than 10 ppm.

The step of capturing the acquired hydrogen in the hydrogen storage tank may include transferring and capturing the acquired hydrogen in the hydrogen storage tank through the product lines, and may further include the step of circulating and feeding the hydrogen in the hydrogen storage tank for use in the cleaning step of the other adsorption tower and the product pressurization step of the pretreatment unit and the hydrogen purification unit.

Each of the plurality of adsorption towers including the pretreatment unit and the hydrogen purification unit may iteratively undergo the hydrogen purification process in a periodical manner as the mixed hydrogen gas is continuously fed after one cycle of the process of adsorbing and removing moisture, ammonia and nitrogen.

Figure 2:
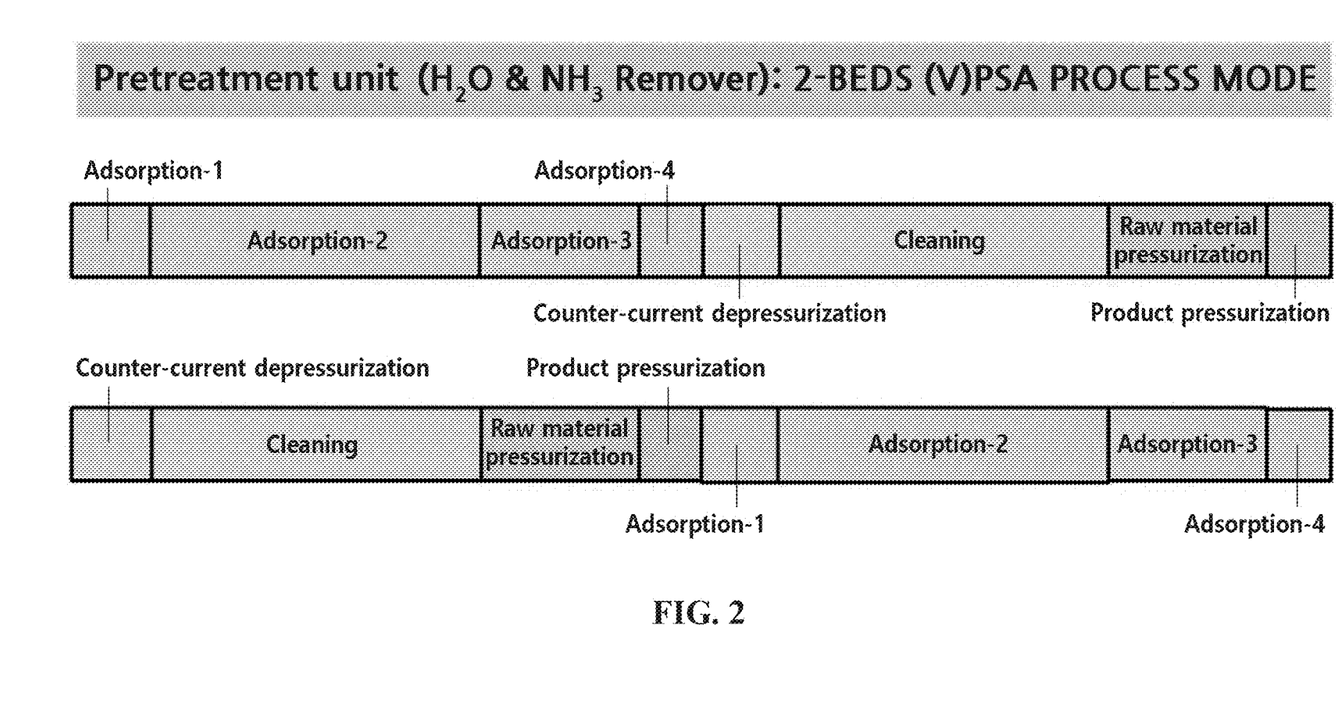
FIG. 2 is a table showing a process step cycle for moisture and ammonia removal of a pretreatment unit using a pressure swing adsorption apparatus according to the present disclosure.

FIG. 2 is a table showing the process step cycle for moisture and ammonia removal of the pretreatment unit using the pressure swing adsorption apparatus according to the present disclosure. FIG. 2 shows the adsorption, depressurization, cleaning, raw material pressurization and product pressurization steps in each adsorption tower 111-116 of the pretreatment unit. The driving cycle of the pretreatment unit may be at least five times or more longer than the driving cycle of the hydrogen purification unit to minimize hydrogen losses.

According to FIG. 2, the mixed hydrogen gas produced after decomposition of raw gas, i.e., ammonia, is fed into the first adsorption tower 111 of the pretreatment unit through the raw material feed pipe 101 with the first feed valve 141 connected to the first adsorption tower 111 open. The impurities such as moisture and undecomposed ammonia contained in the mixed hydrogen gas fed into the first adsorption tower 111 are allowed to pass through the first and second adsorbents packed in the first adsorption tower 111 in a multilayer structure to adsorb and remove moisture and ammonia in a sequential order, and acquire the remaining mixed gas including nitrogen and hydrogen. Subsequently, the mixed gas including nitrogen and hydrogen passes through the first adsorption tower 111 and exits the open valve, and then is transferred through the pipe 102 and fed into the third adsorption tower 113 in the hydrogen purification unit.

The ammonia concentration in the mixed hydrogen gas fed from the pretreatment unit into the hydrogen purification unit is monitored in real time to maintain the ammonia concentration below 0.1 ppm. In this instance, during the adsorption step of the first adsorption tower 111, the second adsorption tower 112 undergoes the counter-current depressurization, cleaning, raw material pressurization and product pressurization steps in a sequential order. First, after the counter-current depressurization step through the first and second discharge valves 161, 162, the valve 181a is opened and the valve 181b is kept closed to use the gas fed from the pipe 106 which transfers the cleaning gas of the hydrogen purification unit as cleaning gas. The cleaning gas is discharged at the same time as the counter-current depressurization through the second discharge valve 162, and the counter-current depressurization and the cleaning tail gas may be used as fuels for the heat source supply of the ammonia decomposition apparatus. The tail gas of the pretreatment unit may be returned to the ammonia fuel feed line at the front end of the ammonia decomposition process if necessary to minimize ammonia losses.

After the cleaning of the second adsorption tower 112, the second discharge valve 162 is closed and the second pressurization valve 152 is opened for the raw material pressurization. After the raw material pressurization, the second pressurization valve 152 is closed, and for the product pressurization, the valve 191 in the pipe 105 is opened and the valve 181a is opened. The final pressure of the raw material pressurization step is determined according to the amount of moisture and ammonia in the mixed hydrogen gas fed into the hydrogen purification unit. After the product pressurization of the second adsorption tower 112, the second pressurization valve 142 is opened. The impurities such as moisture and undecomposed ammonia contained in the mixed hydrogen gas fed into the second adsorption tower 112 are adsorbed in a sequential order through the first and second adsorbents packed in the second adsorption tower 112 to acquire the mixed gas including nitrogen and hydrogen, and the valve 181b on the feed pipe 102 passing through the second adsorption tower 112 is opened to transfer the mixed gas to the hydrogen purification unit.

Figure 3:
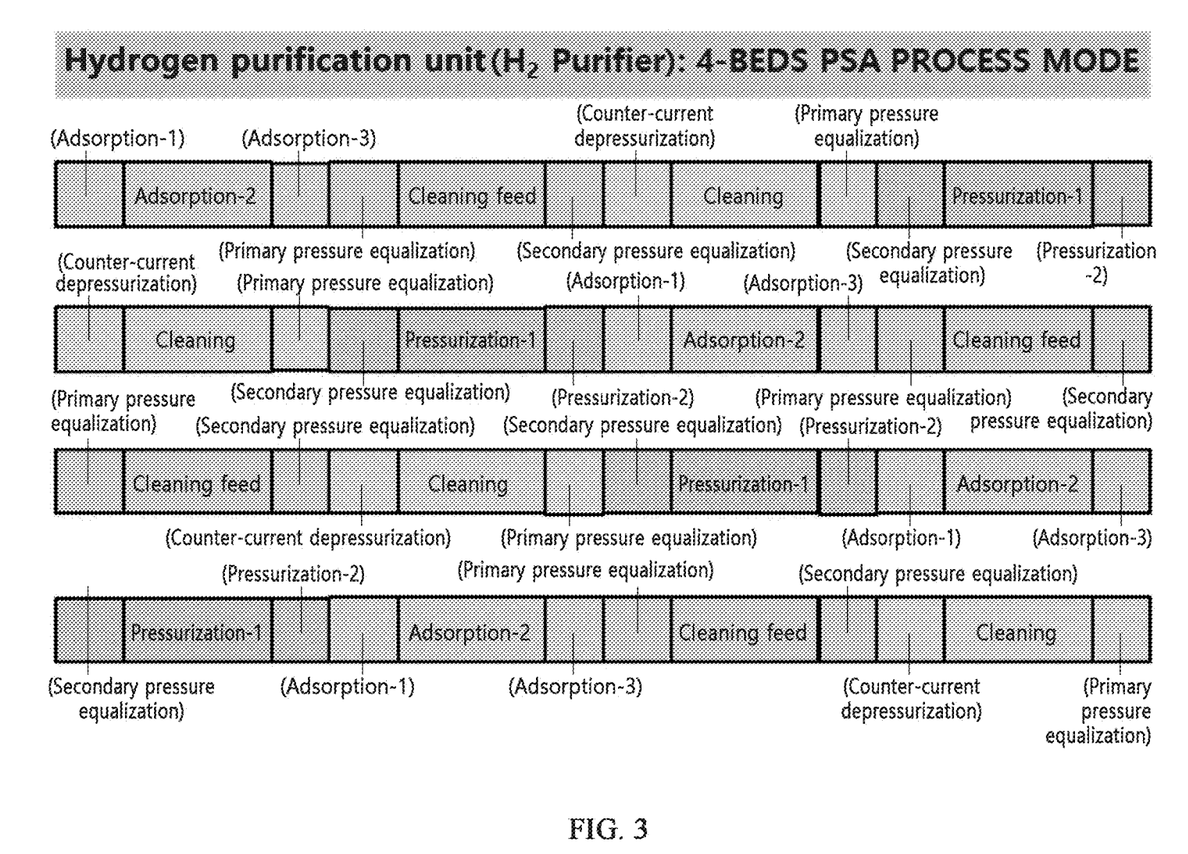
FIG. 3 is a table showing a process step cycle for nitrogen removal of a hydrogen purification unit using a pressure swing adsorption apparatus according to the present disclosure.

FIG. 3 is a table showing the process step cycle for nitrogen removal of the hydrogen purification unit using the pressure swing adsorption apparatus according to the present disclosure. Referring to FIG. 3, first, the hydrogen purification unit feeds the mixed hydrogen gas free of moisture and ammonia passing through the pretreatment unit into the third adsorption tower 113 through the pipe 102. In this instance, among the third to sixth feed valves 143-146, only the third feed valve 143 connected to the third adsorption tower 113 is open. The impurities such as nitrogen contained in the mixed hydrogen gas fed into the third adsorption tower 113 are adsorbed through the third adsorbents packed in the third adsorption tower 113 to acquire high purity purified hydrogen, and the first product line valve 182 of the pipe 104 is opened to transfer hydrogen passing through the third adsorption tower 113 to the hydrogen storage tank 131.

After the removal of the mixed hydrogen gas through the third adsorption tower 113, the purified hydrogen is transferred to the hydrogen storage tank 131, and at the same time, the second desorption valve 164 connected to the pipe 102 is opened for the counter-current depressurization of the fourth adsorption tower 114 to the atmospheric level.

Additionally, the fifth adsorption tower 115 and the sixth adsorption tower 116 undergo co-current depressurization and the primary and secondary pressure equalization steps, and the effluent gas through the fifth adsorption tower 115 is fed into the sixth adsorption tower 116 through the third pressure equalization line valve 174b and the fourth pressure equalization line valve 175b, and is used to pressurize the sixth adsorption tower 116. Subsequently, after the primary and secondary pressure equalization steps of the fifth adsorption tower 115 and the sixth adsorption tower 116, the fifth adsorption tower 115 undergoes co-current depressurization through the third cleaning line valve 174c and the cleaning feed step of feeding a large amount of effluent gas into the fourth adsorption tower 114 as cleaning gas. Here, the second cleaning line valve 173c and the second desorption valve 164 connected to the pipe 103 of the tail gas are opened to clean the adsorbent in the fourth adsorption tower 114 with the gas fed from the fifth adsorption tower 115, and the sixth pressurization line valve 175a is opened to introduce the purified hydrogen product into the sixth adsorption tower 116 in the counter-current direction, so that the pressure of the sixth adsorption tower 116 reaches the adsorption pressure.

When the step of cleaning the fourth adsorption tower 114 by the effluent gas of the fifth adsorption tower 115 is completed, the second desorption valve 164 connected to the fourth adsorption tower 114 is closed, and the fifth adsorption tower 115 and the fourth adsorption tower 114 are connected to each other through the open third pressure equalization line valve 174b and the open second pressure equalization line valve 173b for the secondary pressure equalization step.

In this instance, each of the third adsorption tower 113 and the sixth adsorption tower 116 continuously undergoes the adsorption step and the product pressurization step. Subsequently, when the adsorption step of the third adsorption tower 113 is completed, the third feed valve 143 and the first recovery valve 182 connected to the raw material feed pipe 101 and the second adsorption tower 112 are closed, and the first pressure equalization line valve 172b and the second pressure equalization line valve 173b are opened for pressure equalization of the third adsorption tower 113 and the fourth adsorption tower 114.

Additionally, the sixth pressurization line valve 175a is closed and the sixth feed valve 146 connected to the raw material feed pipe 101 and the fourth recovery valve 185 connected to the pipe 104 for recovering the hydrogen product are opened for the adsorption step of the sixth adsorption tower 116, and the third pressure equalization line valve 174b is closed and the third desorption valve 165 is opened for the counter-current depressurization step of the fifth adsorption tower 115.

Additionally, after the pressure equalization of the third adsorption tower 113 and the fourth adsorption tower 114, the third adsorption tower 113 undergoes co-current depressurization through the first cleaning line valve 172c and the cleaning feed step of feeding the effluent gas as cleaning gas of the fifth adsorption tower 115, and in this instance, the third cleaning line valve 174c and the third desorption valve 165 are opened to clean the adsorbent in the fifth adsorption tower 115 with the gas fed from the third adsorption tower 113 below the atmospheric pressure. Subsequently, the second pressure equalization line valve 173b is closed and the fourth pressurization line valve 173a is opened to introduce the purified hydrogen product into the fourth adsorption tower 114 in the counter-current flow, so that the pressure of the fourth adsorption tower 114 reaches the adsorption pressure.

In this instance, when the step of cleaning the fifth adsorption tower 115 with the effluent gas of the third adsorption tower 113 is completed, the third desorption valve 165 is closed, and the fifth adsorption tower 115 and the third adsorption tower 113 are connected to each other through the first pressure equalization line valve 172b and the third pressure equalization line valve 174b for the secondary pressure equalization step. Here, each of the sixth adsorption tower 116 and the fourth adsorption tower 114 continuously undergoes the adsorption step and the product pressurization step.

Subsequently, when the adsorption step in the sixth adsorption tower 116 is completed, the sixth feed valve 146 and the fourth recovery valve 185 connected to the raw material feed pipe are closed, and the fourth pressure equalization line valve 175b and the third pressure equalization line valve 174b are opened for pressure equalization of the fifth adsorption tower 115 and the sixth adsorption tower 116.

Subsequently, the fourth pressurization line valve 173a is closed and the fourth feed valve 144 connected to the raw material feed pipe and the second recovery valve 183 connected to the fourth adsorption tower 114 are opened for the adsorption step of the fourth adsorption tower 114. In this instance, the third pressurization line valve 172b and the first desorption valve 163 connected to the pipe 102 of the tail gas are opened for the counter-current depressurization step of the third adsorption tower 113.

Additionally, after the pressure equalization of the sixth adsorption tower 116 and the fifth adsorption tower 115, the sixth adsorption tower 116 undergoes co-current depressurization through the fourth cleaning line valve 175c and the cleaning feed step of feeding the effluent gas as cleaning gas of the third adsorption tower 113, and the first cleaning line valve 172c and the first desorption valve 163 connected to the pipe 102 of the tail gas are opened to clean the third adsorbent in the third adsorption tower 113 with the gas fed from the sixth adsorption tower 116.

Subsequently, the third pressure equalization line valve 174b is closed and the fifth pressurization line valve 174a is opened to introduce the purified hydrogen product into the fifth adsorption tower 115 in the counter-current flow, so that the pressure of the fifth adsorption tower 115 reaches the adsorption pressure. Additionally, when the step of cleaning the third adsorption tower 113 with the effluent gas of the sixth adsorption tower 116 is completed, the first desorption valve 163 is closed and the third adsorption tower 113 and the sixth adsorption tower 116 are connected to each other through the first pressure equalization line valve 172b and the fourth pressure equalization line valve 175b for the secondary pressure equalization step. In the same way as the foregoing description, each of the fourth adsorption tower 114 and the fifth adsorption tower 115 continuously undergoes the adsorption step and the product pressurization step.

Finally, when the adsorption step in the fourth adsorption tower 114 is completed, the fourth feed valve 144 connected to the raw material feed pipe 101 and the second recovery valve 183 connected to the fourth adsorption tower 114 are closed, and the first pressure equalization line valve 172b and the third pressure equalization line valve 173b are opened for pressure equalization of the fourth adsorption tower 114 and the third adsorption tower 113. Additionally, the fifth pressurization line valve 174a is closed, and the fifth feed valve 145 connected to the raw material feed pipe 101 and the third recovery valve 184 connected to the fifth adsorption tower 115 are opened for the adsorption step of the fifth adsorption tower 115. In this instance, the sixth pressurization line valve 175a is closed, and the fourth desorption valve 166 connected to the pipe 102 of the tail gas is opened for the counter-current depressurization step of the sixth adsorption tower 116. Additionally, after the pressure equalization of the third adsorption tower 113 and the fourth adsorption tower 114, the fourth adsorption tower 114 undergoes co-current depressurization through the second cleaning line valve 173c and the cleaning feed step of feeding the effluent gas as cleaning gas of the sixth adsorption tower 116.

The fifth cleaning line valve 175c and the fourth desorption valve 166 connected to the pipe 102 of the tail gas are opened to clean the adsorbent in the sixth adsorption tower 116 with the gas fed from the fourth adsorption tower 114, and the second pressure equalization line valve 173b is closed and the third pressurization line valve 172a is opened to introduce the purified hydrogen product into the third adsorption tower 113 in the counter-current flow, so that the pressure of the third adsorption tower 113 reaches the adsorption pressure. Additionally, when the step of cleaning the sixth adsorption tower 116 with the effluent gas of the fourth adsorption tower 114 is completed, the fourth desorption valve 166 connected to the pipe 102 of the tail gas is closed, and the fourth adsorption tower 114 and the sixth adsorption tower 116 are connected to each other through the second pressure equalization line valve 173b and the fourth pressure equalization line valve 175b for the secondary pressure equalization step. In this instance, each of the fifth adsorption tower 115 and the third adsorption tower 113 continuously undergoes the adsorption step and the product pressurization step. According to the hydrogen purification method using the pressure swing adsorption apparatus of the present disclosure having the hydrogen purification process for each step, the individual hydrogen purification process steps are performed for each adsorption tower 113-116, and when one cycle of the hydrogen purification process is completed for each adsorption tower 113-116, the cyclic hydrogen purification process is iteratively performed as the mixed hydrogen gas is fed from the raw material feed pipe 101.

Additionally, some of the tail gas may be fed into the first and second adsorption towers 111, 112 of the pretreatment unit through the pipe 106 for feeding the cleaning gas. The cleaning gas is generated when the third to sixth adsorption towers 113-116 undergo the cleaning process, and the cleaning gas is fed into the pretreatment unit at the atmospheric level.

Hereinafter, the present disclosure will be described in more detail based on an embodiment, but the present disclosure is not limited to the following embodiment.

Embodiment 1: Hydrogen Purification Using Pressure Swing Adsorption Apparatus

A process of purifying hydrogen from mixed gas containing 72.75 vol % of hydrogen, 24.25 vol % of nitrogen and 3.0 vol % of ammonia is performed using the pressure swing adsorption apparatus including the pretreatment unit in which two adsorption towers are arranged in parallel and the hydrogen purification unit in which four adsorption towers are arranged in parallel.

30 wt % of silica gel as the first adsorbent capable of adsorbing moisture is packed at the lower layer region of the first and second adsorption towers in the pretreatment unit, and 70 wt % of activated carbon impregnated with 5 wt % of magnesium as the second adsorbent capable of adsorbing ammonia is packed at the upper layer region of the first and second adsorption towers to form a multilayer structure. Additionally, each of the third to sixth adsorption towers of the hydrogen purification unit is packed with zeolite CaX capable of adsorbing nitrogen. Additionally, the raw gas feed pressure is 5.5 atmospheric pressure. The process cycle in each process is equally maintained, and the counter-current depressurization start pressure in two processes is equally maintained. In this instance, the raw gas throughput is 22.00 Nl/min.

As result of measuring the purified hydrogen using the pressure swing adsorption apparatus, the purity of the purified hydrogen is 99.99755%, and the hydrogen recovery rate is 82.75%.

DETAILED DESCRIPTION OF MAIN ELEMENTS

100: Pressure swing adsorption apparatus
101: Raw material feed pipe
102-106: A plurality of pipes
111, 112: First and second adsorption towers of pretreatment unit
113-116: Third to sixth adsorption towers of hydrogen purification unit
121, 122: Vacuum pump
131: Hydrogen storage tank
141-146: First to sixth feed valves
151, 152: First and second pressurization valves
161, 162: First and second discharge valves
163-166: First to fourth desorption valves
171a, 171b: First line valve
172a, 173a, 174a, 175a: Third to sixth pressurization line valves
172b, 173b, 174b, 175b: First to fourth pressure equalization line valves
172c, 173c, 174c, 175c: First to fourth cleaning line valves
181a, 181b, 191: Valve
182-185: First to fourth product line valves

The invention claimed is:

1. A pressure swing adsorption apparatus for hydrogen purification from decomposed ammonia gas, the pressure swing adsorption apparatus comprising:
a plurality of adsorption towers in a pretreatment unit, connected to a raw material feed pipe and a plurality of adsorption towers in a hydrogen purification unit;
a vacuum pump connected to the adsorption towers to keep the adsorption towers in a vacuum state;
a hydrogen storage tank to capture purified hydrogen from the adsorption towers; and
a plurality of valves to open/close a plurality of pipes connected to the adsorption towers, the vacuum pump and the hydrogen storage tank,
wherein each adsorption tower in the pretreatment unit is packed with a first adsorbent and a second adsorbent, which are distinct in material, forming a multilayer structure, to selectively adsorb and remove moisture and ammonia included in mixed hydrogen gas produced after ammonia decomposition fed through the raw material feed pipe, and
wherein each adsorption tower in the hydrogen purification unit is packed with a third adsorbent to purify hydrogen by selectively adsorbing nitrogen included in the mixed hydrogen gas free of moisture and ammonia from the pretreatment unit.

2. A pressure swing adsorption apparatus for hydrogen purification from decomposed ammonia gas, the pressure swing adsorption apparatus comprising:
a plurality of adsorption towers in a pretreatment unit, connected to a raw material feed pipe and a plurality of adsorption towers in a hydrogen purification unit;
a vacuum pump connected to the adsorption towers to keep the adsorption towers in a vacuum state;
a hydrogen storage tank to capture purified hydrogen from the adsorption towers; and
a plurality of valves to open/close a plurality of pipes connected to the adsorption towers, the vacuum pump and the hydrogen storage tank,
wherein at least two adsorption towers of the pretreatment unit are arranged in parallel, and each of the at least two adsorption towers is packed with a first adsorbent and a second adsorbent in a multilayer structure to selectively adsorb and remove moisture and ammonia included in mixed hydrogen gas produced after ammonia decomposition fed through the raw material feed pipe, and
wherein at least four adsorption towers of the hydrogen purification unit are arranged in parallel, and each of the at least four adsorption towers is packed with a third adsorbent to purify hydrogen by selectively adsorbing nitrogen included in the mixed hydrogen gas free of moisture and ammonia from the pretreatment unit.

3. The pressure swing adsorption apparatus for hydrogen purification from decomposed ammonia gas according to claim 1, wherein the first adsorbent is packed at a lower layer region in each adsorption tower of the pretreatment unit, and includes at least one of first activated alumina or silica gel capable of removing moisture.

4. The pressure swing adsorption apparatus for hydrogen purification from decomposed ammonia gas according to claim 1, wherein an amount of the first adsorbent packed in each adsorption tower of the pretreatment unit is 5 to 40 wt %.

5. The pressure swing adsorption apparatus for hydrogen purification from decomposed ammonia gas according to claim 1, wherein the second adsorbent is packed at an upper layer region in each adsorption tower of the pretreatment unit, and includes at least one selected from the group consisting of metal impregnated activated carbon, silica gel and second activated alumina capable of removing ammonia.

6. The pressure swing adsorption apparatus for hydrogen purification from decomposed ammonia gas according to claim 5, wherein the metal impregnated activated carbon is activated carbon impregnated with at least one metal selected from the group consisting of Mg, Ca, Mn and Cu.

7. The pressure swing adsorption apparatus for hydrogen purification from decomposed ammonia gas according to claim 5, wherein an amount of metal impregnated in the metal impregnated activated carbon is 1 to 10 wt %.

8. The pressure swing adsorption apparatus for hydrogen purification from decomposed ammonia gas according to claim 1, wherein an amount of the second adsorbent packed in the adsorption tower of the pretreatment unit is 60 to 95 wt %.

9. The pressure swing adsorption apparatus for hydrogen purification from decomposed ammonia gas according to claim 1, wherein the third adsorbent includes at least one selected from the group consisting of zeolite Lix, zeolite CaX, zeolite NaX, zeolite NaA and zeolite CaA.

10. The pressure swing adsorption apparatus for hydrogen purification from decomposed ammonia gas according to claim 1, wherein the first adsorbent is packed at a lower layer region in the adsorption tower of the pretreatment unit, and includes first activated alumina or silica gel capable of removing moisture,
wherein the first adsorbent is packed in an amount of 10 to 35 wt % relative to the second adsorbent in each adsorption tower of the pretreatment unit,
wherein the second adsorbent is packed at an upper layer region in each adsorption tower of the pretreatment unit, and includes metal impregnated activated carbon capable of removing ammonia,
wherein the second adsorbent is packed in an amount of 65 to 90 wt % relative to the first adsorbent in each adsorption tower of the pretreatment unit,
wherein the metal impregnated activated carbon includes magnesium (Mg) impregnated activated carbon or calcium (Ca) impregnated activated carbon,
wherein an amount of metal impregnated in the metal impregnated activated carbon is 1 to 8 wt %, and
wherein the third adsorbent includes at least one of zeolite LiX or zeolite CaX.

11. A hydrogen purification method using the pressure swing adsorption apparatus according to claim 1 including the plurality of adsorption towers in the pretreatment unit, connected to a raw material feed pipe and the plurality of adsorption towers in the hydrogen purification unit, connected to the raw material feed pipe; the vacuum pump connected to the adsorption towers to keep the adsorption towers in a vacuum state; the hydrogen storage tank to capture purified hydrogen from the adsorption towers; and the plurality of valves to open/close the plurality of pipes connected to the adsorption towers, the vacuum pump and the hydrogen storage tank, the hydrogen purification method comprising the steps of:

feeding mixed hydrogen gas produced after ammonia decomposition into thean adsorption tower of the pretreatment unit through the raw material feed pipe;
selectively adsorbing and removing moisture by allowing the fed mixed hydrogen gas to pass through a first adsorbent packed at a lower layer region of the adsorption tower in the pretreatment unit;
selectively adsorbing and removing ammonia by allowing mixed hydrogen gas free of moisture to pass through a second adsorbent packed at an upper layer region of the adsorption tower in the pretreatment unit;
feeding mixed hydrogen gas free of ammonia into an adsorption tower of the hydrogen purification unit;
selectively adsorbing and removing nitrogen by allowing the fed mixed hydrogen gas free of ammonia to pass through a third adsorbent packed in the adsorption tower in the hydrogen purification unit to acquire the purified hydrogen; and
capturing the acquired hydrogen in the hydrogen storage tank.

12. The hydrogen purification method using the pressure swing adsorption apparatus according to claim 11, wherein the step of selectively adsorbing and removing ammonia comprises adsorbing and removing ammonia such that an amount of ammonia in the mixed hydrogen gas free of moisture is less than 0.1 ppm.

13. The hydrogen purification method using the pressure swing adsorption apparatus according to claim 11, wherein the plurality of adsorption towers of the hydrogen purification unit undergo an adsorption step, a first primary pressure equalization step, a cleaning feed step, a first secondary pressure equalization step, a counter-current depressurization step, a cleaning step, a second primary pressure equalization step, a second secondary pressure equalization step, and a pressurization step in a sequential order to properly remove nitrogen from the mixed hydrogen gas free of moisture and ammonia fed into the hydrogen purification unit and increase hydrogen product purity and recovery rate.

14. The hydrogen purification method using the pressure swing adsorption apparatus according to claim 13, further comprising:
feeding a remaining tail gas from an adsorption tower of the hydrogen purification unit into the adsorption tower of the pretreatment unit having undergone the counter-current depressurization step as purge gas to regenerate the adsorbent of the pretreatment unit.

15. The hydrogen purification method using the pressure swing adsorption apparatus according to claim 11, wherein the step of selectively adsorbing and removing nitrogen to acquire the purified hydrogen comprises adsorbing and removing nitrogen such that an amount of nitrogen in the mixed hydrogen gas free of ammonia is less than 10 ppm.

* * * * *